US007980055B2

(12) United States Patent
Lindenfeld

(10) Patent No.: US 7,980,055 B2
(45) Date of Patent: Jul. 19, 2011

(54) GAS TURBINE EXHAUST DIFFUSER

(75) Inventor: John William Lindenfeld, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 741 days.

(21) Appl. No.: 11/499,486

(22) Filed: Aug. 4, 2006

(65) Prior Publication Data

US 2010/0269480 A1 Oct. 28, 2010

Related U.S. Application Data

(60) Provisional application No. 60/705,880, filed on Aug. 4, 2005.

(51) Int. Cl.
*F02C 7/08* (2006.01)

(52) U.S. Cl. ........................................ 60/39.5; 415/126

(58) Field of Classification Search .................. 60/39.5; 415/126, 211.2, 221
See application file for complete search history.

(56) References Cited

U.S. PATENT DOCUMENTS 3,030,005 A * 4/1962 Le Nabour et al. ........... 417/179
3,491,537 A * 1/1970 Stona ......................... 60/39.512
3,568,443 A * 3/1971 Fonda-Bonardi ............... 60/646
4,097,187 A * 6/1978 Korta ............................ 415/161
4,391,564 A * 7/1983 Garkusha et al. ............. 415/126
4,391,566 A 7/1983 Takamura
4,398,865 A * 8/1983 Garkusha et al. ............. 415/148
5,203,674 A 4/1993 Vinciguerra
5,209,634 A 5/1993 Owczarek
5,462,088 A 10/1995 Poux et al.
5,518,366 A 5/1996 Gray
5,603,605 A 2/1997 Fonda-Bonardi
5,669,812 A 9/1997 Schockemoehl et al.
5,737,915 A 4/1998 Lin et al.
5,957,768 A 9/1999 Schockemoehl et al.
6,807,803 B2 10/2004 Poccia et al.
6,866,479 B2 3/2005 Ishizaka et al.
6,877,321 B2 4/2005 Retzlaff et al.
6,896,475 B2 5/2005 Graziosi et al.
6,973,771 B2 12/2005 Nottin
7,055,305 B2 6/2006 Baxter et al.
2003/0136102 A1 7/2003 Nottin
2004/0088989 A1 * 5/2004 Dowman ........................ 60/772
2004/0107690 A1 6/2004 Poccia et al.
2004/0118102 A1 6/2004 Child
2004/0187472 A1 9/2004 Retzlaff et al.
(Continued)

OTHER PUBLICATIONS

International Search Report and Written Opinion, PCT/US06/30491, Mar. 1, 2007, Rolls-Royce Power Engineering plc.

(Continued)

*Primary Examiner* — Michael Cuff
*Assistant Examiner* — Phutthiwat Wongwian
(74) *Attorney, Agent, or Firm* — Krieg DeVault LLP

(57) ABSTRACT

A gas turbine including an exhaust diffuser with a flow splitter located between the inner wall and outer wall defining the exhaust gas flow path. In one aspect the flow splitter being moveable independent of the walls defining the exhaust gas flow path to allow for differing thermal movement between the components. In one form a structural member extends from a wall and is coupled to the flow splitter. The wall can have an opening for the through which the structural member is allowed to pass. In some forms a plurality of structural members can be coupled to the flow splitter. In other forms the flow splitter can be independently movable relative to the wall.

19 Claims, 2 Drawing Sheets

U.S. PATENT DOCUMENTS

| | | | |
|---|---|---|---|
| 2004/0228726 | A1 | 11/2004 | Ishizaka et al. |
| 2004/0253096 | A1 | 12/2004 | Legg |
| 2005/0066647 | A1 | 3/2005 | Wiebe et al. |
| 2005/0172607 | A1 | 8/2005 | Ishizaka et al. |

OTHER PUBLICATIONS

Examination Report issued by UK Intellectual Property Office, GB0802249.3, Sep. 21, 2010, Rolls-Royce Corporation, Ltd.

* cited by examiner

GAS TURBINE EXHAUST DIFFUSER

CROSS-REFERENCE TO RELATED APPLICATIONS

The present application claims the benefit of U.S. Provisional Patent Application No. 60/705,880 filed Aug. 4, 2005, which is incorporated herein by reference.

BACKGROUND

The present invention relates generally to exhaust diffusers for gas turbines. More specifically, the present inventions relates to, but not exclusively, exhaust diffusers including a splitter wall within the gas flow path.

The combustion of fuel and compressed air creates a flow of high temperature exhaust gas that passes through a turbine to extract a portion of the energy from the combustion process. The gas exiting the last expansion stage of a gas turbine leaves at relatively high speeds. Gas turbine designers recognize that it is generally necessary to reduce the gas speed considerably before discharging the gases into the atmosphere. The reduction in gas speed will reduce the stress associated with the fluid flow on the exhaust equipment, enhance the performance levels of the turbine by limiting head loss of the flow, and reduce the noise emitted by the exhaust from the turbine.

The exhaust diffuser serves to reduce the speed of the exhaust flow and to increase the pressure of the exhaust gas coming from the last stage of the turbine. Presently, many exhaust diffuser system designs have a variety of shortcomings, drawbacks and disadvantages. Accordingly, there is a need for the unique and inventive exhaust diffuser system according to the present invention.

SUMMARY

One embodiment according to the present invention is a unique exhaust diffuser for a gas turbine. Other embodiments include unique apparatuses, systems, devices, hardware, methods, and combinations of these for exhaust diffuser systems in gas turbines. Further embodiments, forms, objects, features, advantages, aspects, and benefits of the present invention shall become apparent from the following description and drawings.

DESCRIPTION OF THE ILLUSTRATIVE EMBODIMENTS

Figure 1:
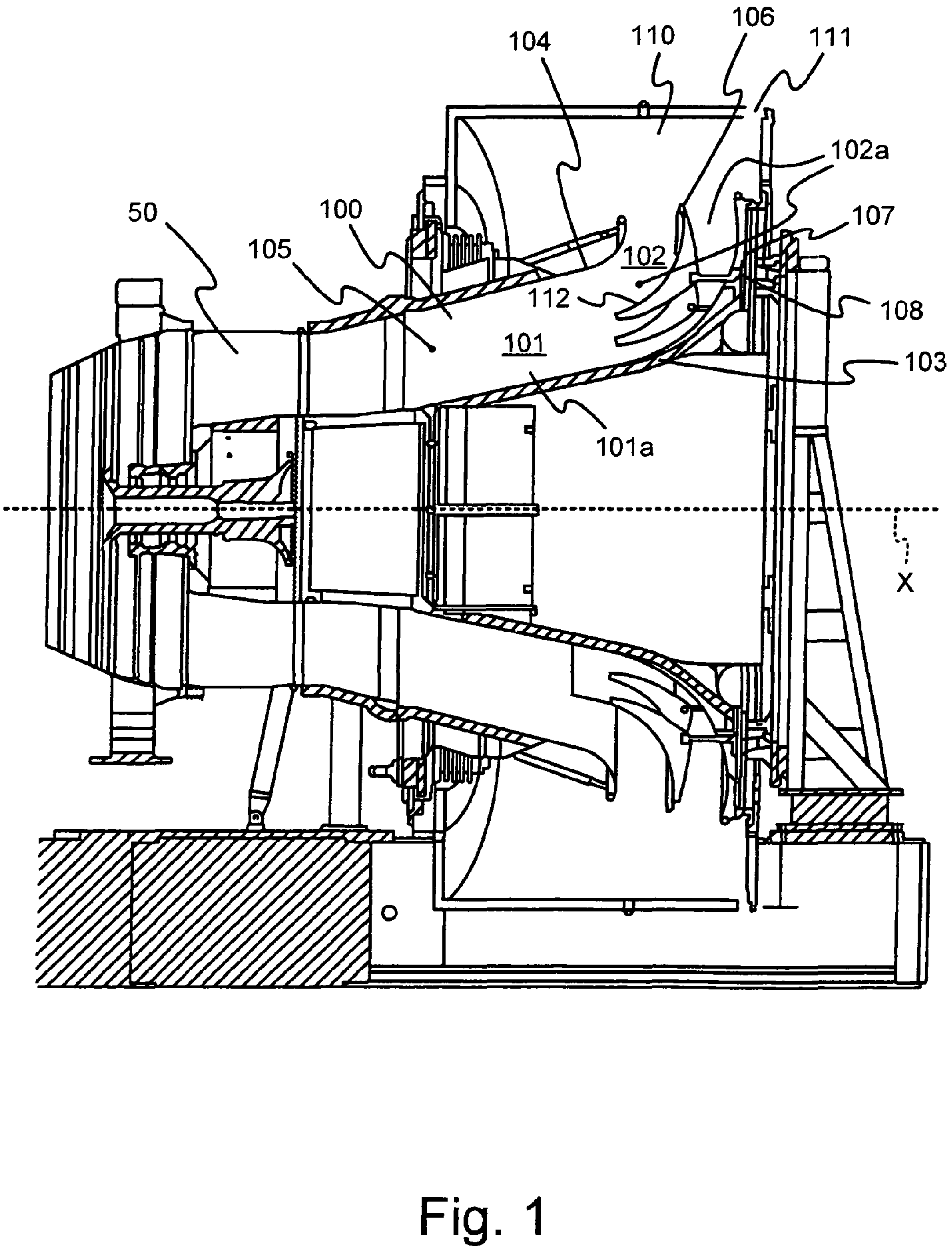
FIG. 1 is an illustrative sectional view of a gas turbine including one embodiment of the exhaust diffuser of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is depicted a non limiting example of gas turbine 50 coupled to and in fluid flow communication with one embodiment of an exhaust diffuser 100. Gas turbine 50 is preferably a land based gas turbine however other applications are contemplated herein. General details regarding gas turbines will be omitted as it is believed a person of skill in the art will be familiar with gas turbine technology and associated components.

In one form of the present invention, exhaust diffuser 100 includes a conical annular section 101 followed by a curved annular section 102. In one form the conical section 101 and the curved section 102 are symmetrical about a centerline X of the exhaust diffuser 100 and/or gas turbine 50. An inner wall 103 and an outer wall 104 are spaced apart to define an annular gas flow path 105. In one form of the present invention annular gas flow path 105 includes a conical gas flow path portion **101*a* and a curved gas flow portion 102*a*. In one form of the present invention the exhaust gas passes out of the curved gas flow portion 102*a* in a generally radial direction into an annular collector 110 and is discharged from annular collector 110 through an annular slot discharge 111**.

A flow splitter 106 is disposed between inner wall 103 and the outer wall 104. The term between is intended to cover the location of the flow splitter at any point in the gas flow path 105 between the inner wall 103 and outer wall 104 and is not limited to being at the mid point between the walls unless specifically provided to the contrary. In one form flow splitter 106 is symmetrical about the centerline X. In the embodiment depicted in FIG. 1, flow splitter 106 includes a curved wall 112 located within curved section 102 of exhaust diffuser 100. The curved wall 112 may be integral with flow splitter 106 or may be a separate component coupled thereto. The present invention contemplates a variety of shapes and geometries for flow splitter 106 and is not intended to be limited to the curve depicted in the figures unless specifically provided to the contrary. In one form flow splitter 106 is attached to a rigid structure 107 by an attachment system 108. In a preferred form, flow splitter 106 is coupled to a support member/rigid structure 107 by attachment system 108.

Figure 2:
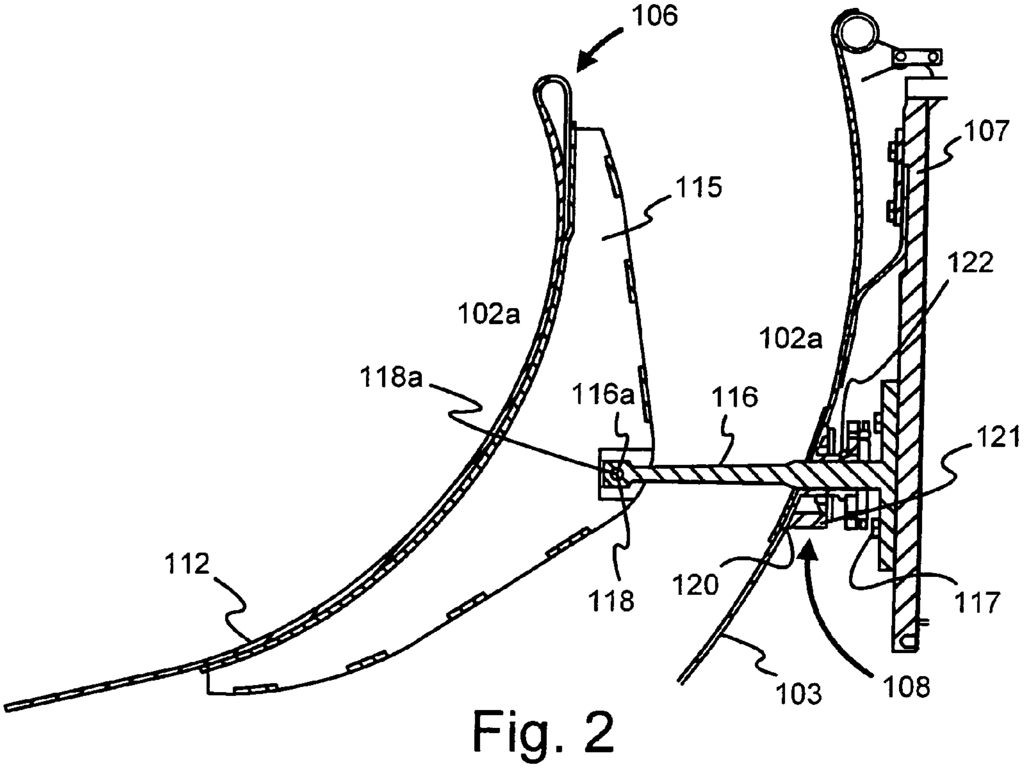
FIG. 2 is an enlarged view of a portion of the exhaust diffuser of FIG. 1.

With reference to FIG. 2, there is illustrated one embodiment of the attachment system 108. In one form the attachment system 108 allows independent movement of the flow splitter 106 relative to the inner wall 103 and outer wall 104 (FIG. 1). The ability for independent movement allows for the differential movement between the attachment system 108 and the inner wall 103 and outer wall 104; the differential movement may be caused by operation of the components at different temperatures which thereby can cause different thermal expansion/contraction. As well as do to deflection caused by aero loading as one of skill in the art would understand.

In one form the flow splitter 106 includes a plurality of circumferentially spaced support ribs 115 which support and stiffen the structure. However, the present invention also contemplates flow splitters without support ribs and also supports ribs having a variety of alternative geometries. In one form, the present invention contemplates that the support ribs 115 are uniformly spaced however in another form the support ribs 115 are non-uniformly spaced. The support ribs 115 may be integral with the flow splitter 106 or may be a separate component coupled to the flow splitter 106. The flow splitter 106 and support ribs 115 are disposed within gas flow path **102*a*. Coupled to the flow splitter 106 is a column/attachment member 116 which extends into the gas flow path 102*a* and supports the flow splitter. In one form of the present invention the columns/attachment members 116 are substantially parallel to centerline X. However, other orientations of the columns/attachment members 116** relative to the centerline X are contemplated herein.

Each of the columns/attachment members 116 may penetrate one of the inner wall 103 and the outer wall 104 and pass into the flow path 102*a*. The present invention further contemplates a form where some of the columns/attachment members may penetrate the inner wall 103 and other of the columns/attachment members may penetrate the outer wall 104. This document will describe the penetration of the wall with reference to the inner wall 103 but it should be understood that penetration of the outer wall 104 by the column/attachment member is also fully contemplated herein. In a preferred form the plurality of columns/attachment members 116 penetrate the inner wall 103 and are coupled to a rigid support structure 107. In one embodiment, the columns/attachment members 116 are connected to the rigid support structure 107. The present invention contemplates that the attachment of the columns/attachment members 116 to the rigid support system 107 may be fixed or may allow for movement at the attachment location. In one form the rigid support structure is defined by a back plate. The present invention further contemplates the utilization of alternative support structures. Further, the present invention contemplates in one form the utilization of fasteners 117 for attaching the columns/attachment members 116 to the rigid support structure 107. However, other techniques for coupling the columns/attachment members 116 to the rigid support structure are contemplated herein.

In one form the columns/attachment members 116 have a narrowing cross section along their length from about the inner wall 103 towards the location where they mount to the flow splitter 106. In one form the relationship between the cross sectional area of the columns/attachment members 116 to the distance from inner wall 103 is linear. In this particular form, the relationship between the cross sectional area of the columns/attachment members 116 and the distance from the inner wall 103 provides flexibility in the column/attachment member to accommodate differential movement of the flow splitter 106 and the rigid support structure 107. However, the present invention fully contemplates columns/attachment members 116 having other relationships between the cross section and length from the inner wall 103 and distance to the flow splitter 106; the relationship may be one of a constant cross sectional area, an increasing cross sectional area along major or minor axis.

In one form, the material utilized in column/attachment member 116 is chosen to provide high yield, creep and high and low cycle fatigue (HCF/LCF) strength in the operating environment of a gas turbine. The type of material contemplated for the column/attachment member includes nickel based alloys such as, but not limited to MARM 247, Inconel 718 and Waspalloy. However, other types of materials are fully contemplated herein. In one form, an end 116*a* of the column/attachment member 116 is coupled with the flow splitter 106 to allow rotational movement between the flow splitter 106 and the end 116*a* of the column/attachment member 116. One embodiment of the present invention includes a pin joint 118 for coupling with the end 116*a* of the column/attachment member 116. The pin joint 118 may include a lock nut or other known mechanical technique to retain the pin 118*a* in place. The location/position of the flow splitter 106 during manufacture or subsequently thereafter may be achieved by placing or removing shims between the column/attachment member 116 and the rigid support structure 107.

In one form, the size/diameter of the plurality of holes 120 in the inner wall 103 where the columns/attachment members 116 penetrate the wall is sized to accommodate the maximum differential thermal movement between the column/attachment member 116 and the wall 103. However, the present application contemplates that other hole sizes can be utilized and there is no intention to limit the present invention to a particular hole size requirement unless specifically provided to the contrary. In one form the plurality of holes 120 are sealed by a sealing system which prevents exhaust gas leakage from the flow path while allowing differential movement between columns/attachment members 116 and inner wall 103. One form of a sealing system of the present invention is set forth below with reference to FIG. 3. In one embodiment at each of the plurality of holes 120 in the inner wall 103, a tube 121 (FIG. 2) is attached to the non-flow side of inner wall 103 and the bore of this tube has been selected to provide the thermal clearance needed for unit operation. In one form the tube 121 is attached to the inner wall 103 by welding.

Figure 3:
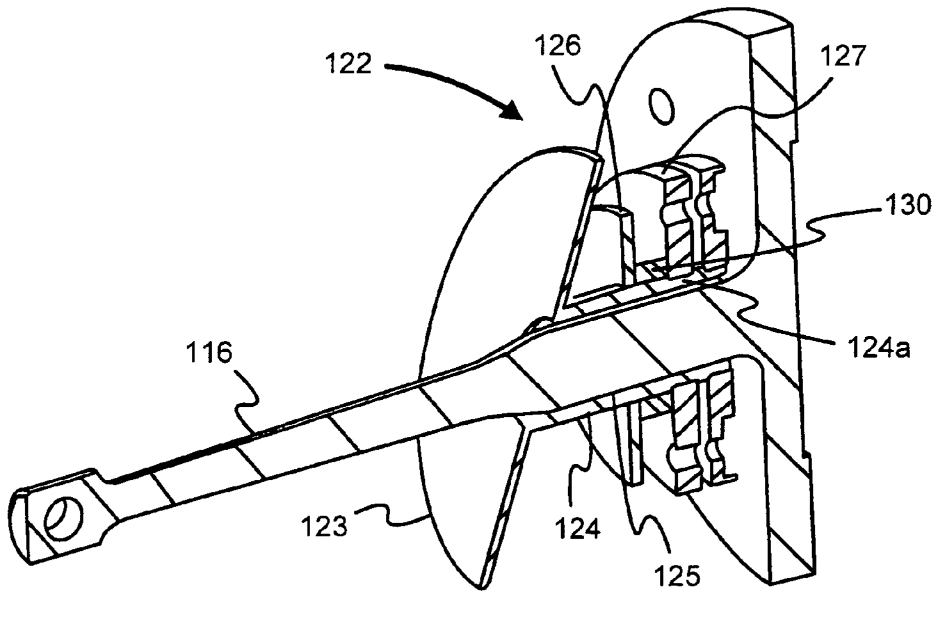
FIG. 3 is an enlarged view of one embodiment of a seal comprising a portion of the exhaust diffuser of FIG. 1.

With reference to FIG. 3, there is illustrated one embodiment of seal 122. Seal 122 is configured to provide a positive fluid seal but allow relative movement between the components. In one form seal 122 includes an outer portion 123 (plate portion) disposed within the fluid flow path and abutting against the inner wall 103 and a cylinder portion 124 which extends through hole 120 (FIG. 2) formed in the inner wall 103. In one form, the inner bore 125 of the cylinder portion 124 has been toleranced to minimize the gap/clearance between the inner bore 125 and the outer radius/surface of the column/attachment member 116. In one form the radial gap/clearance is within a range of about 0.001 inches to about 0.003 inches. However, other radial gaps/clearances are contemplated herein.

In one form a washer 126 is centered on the cylinder portion 124 of the seal 122. The cylinder portion 124 includes a stop 127 and in one form stop 127 is defined by a nut placed on a threaded end 124*a* of the cylinder portion 124. In one embodiment where the stop includes a nut, the nut may be a double locking nut or a split locking nut that utilizes a secondary fastener to draw the halves of the nut together to lock the threads. However, the present application considers a variety of stops and is not intended to be limited to a locking nut unless specifically provided to the contrary. A spring 130 is disposed between the stop 127 and washer 126. The spring may take on many forms and in one embodiment is a wave spring. In one form the spring transmits a load of about ninety pounds; however other spring forces are contemplated herein. The spring 130 is compressed and pushes against the stop 127 and washer 126. Because the stop 127 is fixedly attached to the cylinder portion 124 of the seal the compressive spring load presses upon the washer 126. The effect of the compressive spring load is to transmit a squeezing effect between the washer 126 and the outer portion 123 (plate end). As the inner wall 103 moves radially outward, the axial distance of the inner wall 103 (including the machined tube) increases due to the angled face on the flow side. This increase in distance between the seal (plate end) and the washer translates into additional compression of the spring. In one form the spring 127 has been designed to accommodate all axial length conditions as a result of unit operation. The rigid support structure 107 supports the inner wall 103 on the aft (downstream) end. Thus, as the inner wall 103 moves outward, it also moves forward (upstream). In one form the seal 122 components stay centered on the column/attachment member 116 and maintain the seal but are able to move axially with the diffuser inner wall without creating additional strains.

One form of the present invention contemplates an apparatus, comprising: a support structure; an outer diffuser wall; an inner diffuser wall located within said outer diffuser wall and defining a fluid flow path between said walls; a splitter wall located between at least a portion of said inner and outer diffuser walls, said splitter wall dividing said fluid flow path; and means for coupling said splitter wall to said support structure.

Another form of the present invention contemplates a diffuser comprising: a support structure; an outer wall; an inner wall spaced from said outer wall, said walls defining an annular fluid flow path therebetween, said inner wall including a plurality of holes; a splitter wall located within said annular fluid flow path, said splitter wall dividing at least a portion of said fluid flow path into multiple flow paths; and a plurality of columns coupled between said support structure and said splitter wall, each of said plurality of columns pass through one of said plurality of holes and has a first end rotatably coupled to said splitter wall and a second end fixedly attached to said support structure.

Another form of the present invention contemplates a diffuser comprising: a support structure; an outer wall; an inner wall spaced from said outer wall, said walls defining an annular fluid flow path therebetween, said inner wall including a plurality of holes; a plurality of support posts attached to said support structure and passing through said plurality of holes; and a splitter wall located within said annular fluid flow path and dividing at least a portion of said fluid flow path into multiple flow paths, said splitter wall coupled to each of said plurality of support posts by a pin joint.

Another form of the present invention contemplates an apparatus, comprising: a support structure; an outer diffuser wall; an inner diffuser wall located within said outer diffuser wall and defining a fluid flow path between said walls, said inner diffuser wall including a plurality of holes; a splitter wall located between at least a portion of said inner and outer diffuser walls, said splitter wall dividing said fluid flow path; a plurality of columns passing through said holes and coupling said splitter wall to said support structure; and means for sealing said plurality of holes.

Another form of the present invention contemplates a gas turbine exhaust diffuser, comprising: a support member; an inner wall; an outer wall spaced from said inner wall and defining a fluid flow path therebetween for the passage of an exhaust gas; and a splitter coupled to said support member and located within said fluid flow path, said splitter being moveable independent of said inner and outer walls. Yet another form of the present invention contemplates the exhaust diffuser and further includes a plurality of members coupled between said support member and said splitter for supporting said splitter. Yet another form of the present invention contemplates the exhaust diffuser and further includes a plurality of members coupled between said support member and said splitter for supporting said splitter and wherein each of said plurality of members includes a first end coupled to said support member and a second end coupled to said splitter; and wherein each of said plurality of members has a narrowing cross section along their length between said first end and said second end. Yet another form of the present invention contemplates the exhaust diffuser and further includes a plurality of members coupled between said support member and said splitter for supporting said splitter and wherein one of said inner wall and said outer wall includes a plurality of spaced apertures; wherein said plurality of members are spaced corresponding to said plurality of spaced apertures; and wherein one of said plurality of members passing through each of said apertures. Yet another form of the present invention contemplates the exhaust diffuser and further includes a plurality of members coupled between said support member and said splitter for supporting said splitter and wherein said plurality of members are pivotally coupled at said splitter and fixedly coupled at said support member. Yet another form of the present invention contemplates the exhaust diffuser and further includes a plurality of members coupled between said support member and said splitter for supporting said splitter and wherein one of said inner wall and said outer wall includes a plurality of spaced apertures; wherein said plurality of members are spaced corresponding to said plurality of spaced apertures; wherein one of said plurality of members passing through each of said apertures and wherein said inner wall includes said plurality of spaced apertures. Yet another form of the present invention contemplates the exhaust diffuser and further includes a plurality of members coupled between said support member and said splitter for supporting said splitter and wherein one of said inner wall and said outer wall includes a plurality of spaced apertures; wherein said plurality of members are spaced corresponding to said plurality of spaced apertures; and wherein one of said plurality of members passing through each of said apertures and which further includes means for sealing each of said plurality of apertures. Yet another form of the present invention contemplates a gas turbine exhaust diffuser, comprising: a support member; an inner wall; an outer wall spaced from said inner wall and defining a fluid flow path therebetween for the passage of an exhaust gas; and a splitter coupled to said support member and located within said fluid flow path, said splitter being moveable independent of said inner and outer walls and wherein the diffuser includes a centerline; wherein each of said inner wall, said outer wall and said splitter are symmetric about the centerline; wherein the fluid flow path is an annular flow path including a conical section and a curved section; and wherein said splitter is located substantially within said curved section. Yet another form of the present invention contemplates a gas turbine exhaust diffuser, comprising: a support member; an inner wall; an outer wall spaced from said inner wall and defining a fluid flow path therebetween for the passage of an exhaust gas; and a splitter coupled to said support member and located within said fluid flow path, said splitter being moveable independent of said inner and outer walls and which further includes a plurality of members coupled between said support member and said splitter for supporting said splitter; wherein said inner wall includes a plurality of spaced apertures; wherein said plurality of members are spaced corresponding to said plurality of spaced apertures; wherein one of said plurality of members passing through each of said apertures; and which further includes a seal for sealing each of said plurality of apertures. Yet another form of the present invention contemplates a gas turbine exhaust diffuser, comprising: a support member; an inner wall; an outer wall spaced from said inner wall and defining a fluid flow path therebetween for the passage of an exhaust gas; and a splitter coupled to said support member and located within said fluid flow path, said splitter being moveable independent of said inner and outer walls and which further includes a plurality of members coupled between said support member and said splitter for supporting said splitter; wherein said inner wall includes a plurality of spaced apertures; wherein said plurality of members are spaced corresponding to said plurality of spaced apertures; wherein one of said plurality of members passing through each of said apertures; and which further includes a seal for sealing each of said plurality of apertures and wherein said seal is defined by means for sealing each of said plurality of apertures from exhaust gas leakage. Yet another form of the present invention contemplates a gas turbine exhaust diffuser, comprising: a support member; an inner wall; an outer wall spaced from said inner wall and defining a fluid flow path therebetween for the passage of an exhaust gas; and a splitter coupled to said support member and located within said fluid flow path, said splitter being moveable independent of said inner and outer walls and which further includes a plurality of members coupled between said support member and said splitter for supporting said splitter; wherein said inner wall includes a plurality of spaced apertures; wherein said plurality of members are spaced corresponding to said plurality of spaced apertures; wherein one of said plurality of members passing through each of said apertures; and which further includes a seal for sealing each of said plurality of apertures and wherein the diffuser includes a centerline; wherein each of said inner wall, said outer wall and said splitter are symmetric about the centerline; wherein the fluid flow path is an annular flow path including a conical section and a curved section; and wherein said splitter is located within said curved section.

Another form of the present invention contemplates an apparatus comprising: a gas turbine; and an exhaust diffuser in fluid flow communication with said gas turbine, said exhaust diffuser comprising: a support structure; an outer wall; an inner wall spaced from said outer wall and defining an annular fluid flow path therebetween, said inner wall including a plurality of holes; a flow divider located within said annular fluid flow path for dividing at least a portion of said fluid flow path into multiple flow paths; and a plurality of columns coupled between said support structure and said flow divider, each of said plurality of columns pass through one of said plurality of holes and has a first end coupled to said flow divider and a second end fixedly attached to said support structure. Yet another form of the present invention contemplates an apparatus comprising: a gas turbine; and an exhaust diffuser in fluid flow communication with said gas turbine, said exhaust diffuser comprising: a support structure; an outer wall; an inner wall spaced from said outer wall and defining an annular fluid flow path therebetween, said inner wall including a plurality of holes; a flow divider located within said annular fluid flow path for dividing at least a portion of said fluid flow path into multiple flow paths; and a plurality of columns coupled between said support structure and said flow divider, each of said plurality of columns pass through one of said plurality of holes and has a first end coupled to said flow divider and a second end fixedly attached to said support structure and wherein a joint is defined where said first end is coupled to said flow divider, said joint allows rotation of said first end relative to flow divider. Yet another form of the present invention contemplates an apparatus comprising: a gas turbine; and an exhaust diffuser in fluid flow communication with said gas turbine, said exhaust diffuser comprising: a support structure; an outer wall; an inner wall spaced from said outer wall and defining an annular fluid flow path therebetween, said inner wall including a plurality of holes; a flow divider located within said annular fluid flow path for dividing at least a portion of said fluid flow path into multiple flow paths; and a plurality of columns coupled between said support structure and said flow divider, each of said plurality of columns pass through one of said plurality of holes and has a first end coupled to said flow divider and a second end fixedly attached to said support structure and wherein the gas turbine is a land based gas turbine. Yet another form of the present invention contemplates an apparatus comprising: a gas turbine; and an exhaust diffuser in fluid flow communication with said gas turbine, said exhaust diffuser comprising: a support structure; an outer wall; an inner wall spaced from said outer wall and defining an annular fluid flow path therebetween, said inner wall including a plurality of holes; a flow divider located within said annular fluid flow path for dividing at least a portion of said fluid flow path into multiple flow paths; and a plurality of columns coupled between said support structure and said flow divider, each of said plurality of columns pass through one of said plurality of holes and has a first end coupled to said flow divider and a second end fixedly attached to said support structure and wherein the exhaust diffuser includes a centerline; wherein each of said inner wall, said outer wall and said flow divider are symmetric about the centerline; wherein the fluid flow path includes a conical portion and a curved portion; and wherein said flow divider is located within said curved section.

Yet another form of the present invention contemplates an exhaust diffuser for a gas turbine comprising: a support structure; an outer diffuser wall; an inner diffuser wall spaced from said outer diffuser wall and defining an annular fluid flow path between said walls; a splitter located between at least a portion of said inner and outer diffuser walls, said splitter dividing said fluid flow path; at least one member coupled between said splitter and said support structure for supporting said splitter, said at least one member penetrating the one of said inner diffuser wall and said outer diffuser wall at a hole; and a spring biased seal including a seal plate forming a substantially fluid tight around said hole.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine exhaust diffuser, comprising:
- a support member having a first end and a second end, the first end having a portion fixed to a support structure;
- an inner wall;
- an outer wall spaced from said inner wall and defining a fluid flow path therebetween for the passage of an exhaust gas; and
- a splitter located within the exhaust diffuser and coupled to said support member said splitter being moveable independent of said support member,
- wherein the support member extends through one of the inner and the outer wall.

2. The exhaust diffuser of claim 1, which further includes a plurality of members coupled between said support member and said splitter for supporting said splitter.

3. The exhaust diffuser of claim 2, wherein each of said plurality of members includes a first end coupled to said support member and a second end coupled to said splitter; and wherein each of said plurality of members has a narrowing cross section along their length between said first end and said second end.

4. The exhaust diffuser of claim 2, wherein one of said inner wall and said outer wall includes a plurality of spaced apertures;

wherein said plurality of members are spaced corresponding to said plurality of spaced apertures; and wherein one of said plurality of members passing through each of said apertures.

5. The exhaust diffuser of claim 2, wherein said plurality of members are pivotally coupled at said splitter and fixedly coupled at said support member.

6. The exhaust diffuser of claim 4, wherein said inner wall includes said plurality of spaced apertures.

7. The exhaust diffuser of claim 4, which further includes means for sealing each of said plurality of apertures.

8. The exhaust diffuser of claim 1, wherein the diffuser includes a centerline;

wherein each of said inner wall, said outer wall and said splitter are symmetric about the centerline;

wherein the fluid flow path is an annular flow path including a conical section and a curved section; and wherein said splitter is located substantially within said curved section.

9. The exhaust diffuser of claim 1, which further includes a plurality of members coupled between said support member and said splitter for supporting said splitter;

wherein said inner wall includes a plurality of spaced apertures;

wherein said plurality of members are spaced corresponding to said plurality of spaced apertures;

wherein one of said plurality of members passing through each of said apertures; and which further includes a seal for sealing each of said plurality of apertures.

10. The exhaust diffuser of claim 9, wherein said seal is defined by means for sealing each of said plurality of apertures from exhaust gas leakage.

11. The exhaust diffuser of claim 9, wherein the diffuser includes a centerline;

wherein each of said inner wall, said outer wall and said splitter are symmetric about the centerline;

wherein the fluid flow path is an annular flow path including a conical section and a curved section; and wherein said splitter is located within said curved section.

12. An apparatus comprising: a gas turbine; and an exhaust diffuser in fluid flow communication with said gas turbine, said exhaust diffuser comprising:

a support structure;

an outer wall;

an inner wall spaced from said outer wall and defining an annular fluid flow path therebetween, said inner wall including a plurality of holes;

a flow divider located within said annular fluid flow path for dividing at least a portion of said fluid flow path into multiple flow paths; and a plurality of columns partially extending across the exhaust diffuser and terminating prior to engaging the outer wall, the plurality of columns coupled between said support structure and said flow divider, each of said plurality of columns pass through one of said plurality of holes and has a first end coupled to said flow divider and a second end fixed to said support structure.

13. The apparatus of claim 12, wherein a joint is defined where said first end is coupled to said flow divider, said joint allows rotation of said first end relative to said flow divider.

14. The apparatus of claim 12, wherein the gas turbine is a land based gas turbine.

15. The apparatus of claim 12, wherein the exhaust diffuser includes a centerline;

wherein each of said inner wall, said outer wall and said flow divider are symmetric about the centerline;

wherein the fluid flow path includes a conical portion and a curved portion; and wherein said flow divider is located within said curved section.

16. The apparatus of claim 15, wherein said curved portion has a substantially radial discharge.

17. The apparatus of claim 12, wherein said inner wall and said flow divider are moveable independent of one another.

18. The apparatus of claim 12, which further includes a seal disposed at each of said plurality of holes;

wherein said seal comprising:

a seal plate disposed within said annular flow path and against said inner wall;

a tube connected to said seal plate;

a stop disposed on said tube;

a biasing plate moveable along said tube; and a spring for biasing said biasing plate away from said stop.

19. The apparatus of claim 12, which further includes a seal disposed at each of said plurality of holes, said seal includes a seal plate disposed within said annular flow path and spring biased against said inner wall.

* * * * *